United States Patent [19]
Takashima et al.

[11] 3,985,444
[45] Oct. 12, 1976

[54] HIGHLY SENSITIVE PROCESS FOR MEASURING FINE DEFORMATION

[75] Inventors: Matsuo Takashima, Yokohama; Minoru Ohtsuka, Tokyo; Kazuya Matsumoto, Yokohama, all of Japan

[73] Assignee: Canon Kabushiki Kaisha, Tokyo, Japan

[22] Filed: Sept. 19, 1974

[21] Appl. No.: 567,286

Related U.S. Application Data

[63] Continuation of Ser. No. 409,687, Oct. 26, 1973, abandoned, which is a continuation of Ser. No. 297,643, Oct. 16, 1972, abandoned.

[30] Foreign Application Priority Data
Oct. 16, 1971 Japan................................ 46-81341

[52] U.S. Cl................................ 356/109; 356/32; 356/111
[51] Int. Cl.².......................................... G01B 9/02
[58] Field of Search ............. 356/111, 106, 32, 171, 356/109

[56] References Cited
UNITED STATES PATENTS

| | | |
|---|---|---|
| 3,184,961 | 5/1965 | Bell.................................... 356/111 |
| 3,604,808 | 9/1971 | Watkins............................. 356/106 |
| 3,619,064 | 11/1971 | Brooks et al....................... 356/109 |

OTHER PUBLICATIONS

Langenbeck, P.; "Higher Order Lloyd Interferometer," *Applied Optics,* vol. 9, No. 8, Aug. 1970, pp. 1838–1841.

*Primary Examiner*—John K. Corbin
*Assistant Examiner*—Conrad Clark
*Attorney, Agent, or Firm*—Toren, McGeady and Stanger

[57] ABSTRACT

A highly sensitive process for measuring fine deformation comprises a stage of illumination with beam to on a periodic structure having diffractive function as well as lacking in diffractive function, a stage of selecting wave of diffraction order having conjugate or nearly conjugate relation among diffracted wave fronts projected from the periodic structure by means of said illumination with beam so as to cause mutual interference, thus, the amount of deformation is measured by the interference fringe formed by said mutual interference when the basic period of periodic structure is displaced or periodic structure is deformed.

10 Claims, 12 Drawing Figures

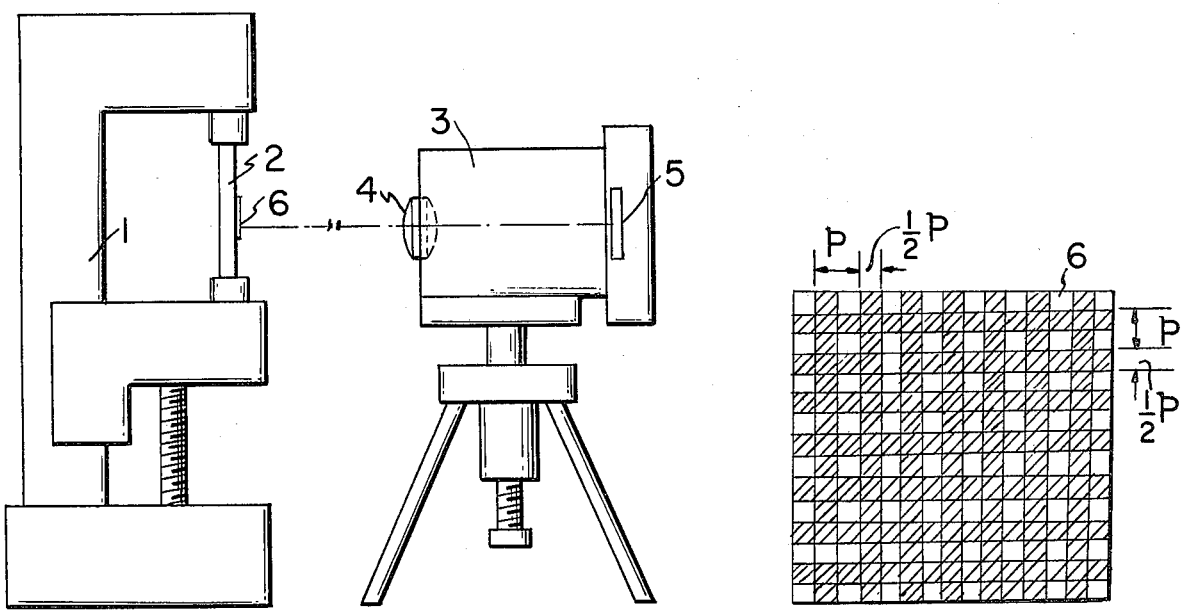
FIG. 1
FIG. 2
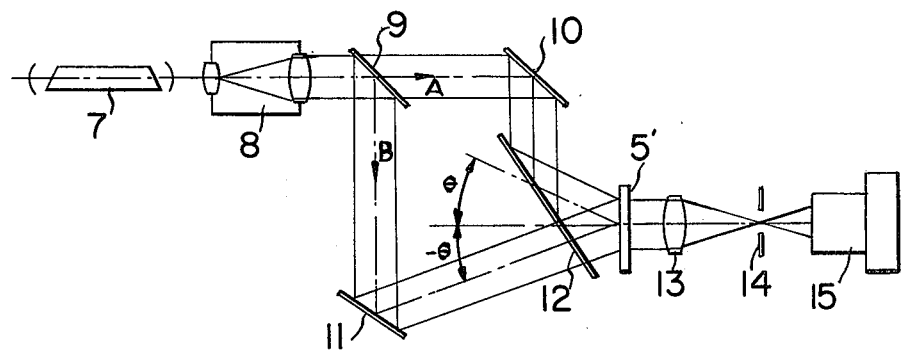
FIG. 3
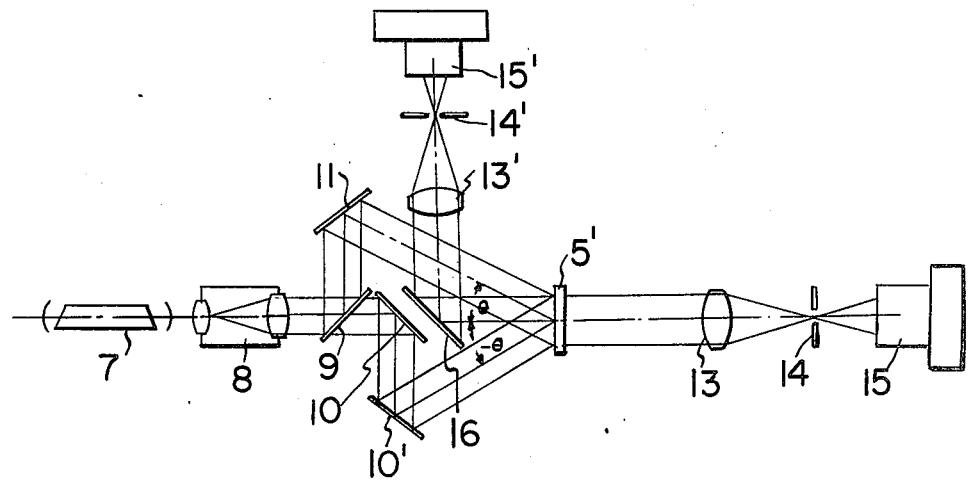
FIG. 4

HIGHLY SENSITIVE PROCESS FOR MEASURING FINE DEFORMATION

This is a Continuation of application Ser. No. 409,687 filed Oct. 26, 1973, now abandoned which, in turn, was a Continuation application of Ser. No. 297,643 filed Oct. 16, 1972, now abandoned.

BACKGROUND OF THE INVENTION

The present invention is related to a process of high sensitivity for measuring the amount of fine deformation of a test object at the material test, non-destructive test or the like.

As for conventional processes for measuring fine deformation of test objects in material tests, non-destructive test or the like have hitherto been known. For instance, the process is carried out by measuring strain based the variation of resistance value caused by deformation, or in a process, so called Moire process, equidistant gratings are formed on a test object by about 20–50 per/mm, and the detected gratings are lined up for reproducing visible structural patterns formed by the two gratings so as to measure the amount of deformation in the pattern.

In the former conventional process which is carried out by strain measurement, the detected amount of one portion to be detected is indicated as an average value of the whole portions to be detected. Therefore, it is necessary to arrange a lot of small portions to be detected adjacent to one another when a local deformation over an extensive range is requested for detection, and thus an increased number of indicators for the detected amount are also indispensable to be installed. Even in this case the maximum dimension of the portion which can be detected is only about 0.5 mm$^2$.

On the other hand, according to the latter Moire process, although the whole area for measurement can be detected uniformly and extensively it is necessary that the gratings of fine pitches are equipped for detecting the amount of fine deformation. This causes difficulties in manufacturing the original plate as well as in printing treatment of the original plate on the test object through photographing.

In order to eliminate the foregoing drawbacks, the prior Patent Application was filed in U.S.A. on Oct. 6, 1971 by the same applicant of the subject application as U.S. Patent application Ser. No. 186,927, now abandoned, entitled with "A METHOD FOR MEASURING DISPLACEMENT OR DEFORMATION" in which a periodic structure having diffractive function is illuminated with beam, and waves of diffraction order in conjugate relation or in similar relation are selected among the diffracted wave fronts projected from the periodic structure by the illumination with beam so as to cause mutual interference, thus, the amounts of deformation occurring at the basic displacement in the period of the periodic structure or deformation in the periodic structure are measured by means the interference fringe formed by the interference.

SUMMARY OF THE INVENTION

A process according to the present invention is essentially an improvement of the foregoing process disclosed in the prior U.S. Patent application Ser. No. 186,927 now abandoned and is characterized in measuring the deformation amount or the like in a periodic structure having diffractive function as well as in a periodic structure lacking in diffractive function. The foregoing process disclosed in the prior invention is able to measure only the periodic structure having diffractive function.

The process according to the present invention, more particularly, comprises stages of converting a periodic structural pattern of a periodic structure into a diffraction grating by means of photographing or other similar methods, then illuminating with beam the diffraction grating, subsequently selecting waves of diffraction order in conjugate relation or in similar relation among the orders of diffracted wave fronts projected from the diffracted grating at the illumination thereon so as to cause mutual interference and to form an interference fringe, thus, the deformation amount at the displacement in the basic period of the periodic structure or at the deformation of the periodic structure is measured by the interference fringe.

The process according to the present invention will now be described with reference to the accompanying drawings by way of examples in a form of embodiment illustrated as a device to carry out the inventive process.

BRIEF DESCRIPTION OF THE DRAWINGS

FIG. 1 to 3 show a device in a form of an embodiment to carry out the process according to the present invention, and FIG. 1 shows a schematic side view of the device which is applicable to the process for obtaining a recorded object having diffractive function, FIG. 2 illustrates a recorded object schematically obtained by means of the device shown in FIG. 1, FIG. 3 shows a schematic development of a device applicable to the process for measuring the deformation of a periodic structure through a recorded object, FIG. 4 is a schematic development of a device in a form of the second embodiment which is a modification of the device shown in FIG. 3, FIGS. 9 and 10 are schematic views of a ground glass plate equipped within the device shown in FIG. 8, FIGS. 11 and 12 show schematic views of an apparatus for rotating the recorded object in which

DESCRIPTION OF PREFERRED EMBODIMENTS

Figure 5:
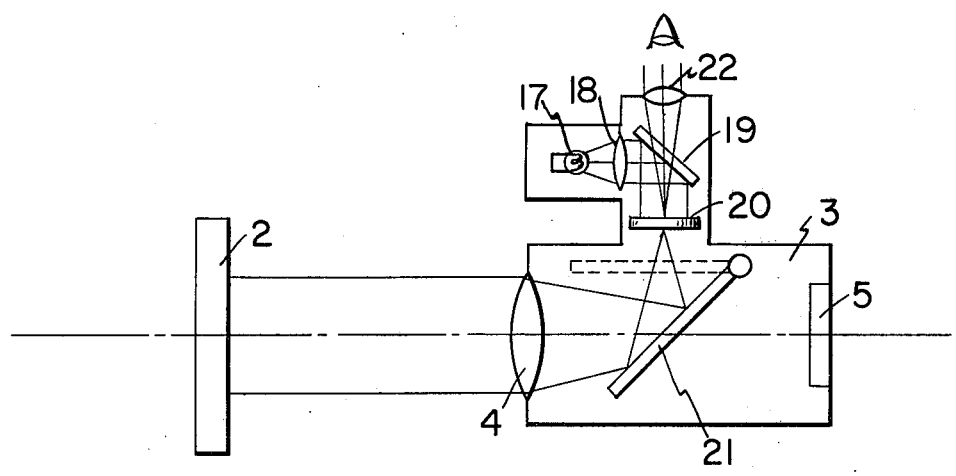
FIG. 5 shows a schematic side view of a device applicable to the process for adjusting both the recorded object and a detector.

According to the embodiment represented in FIG. 1, in which a test object is disposed in the tension tester as a tensile test piece and is measured. The reference numeral 1 designates a tension tester, 2 denotes a tensile test piece having a periodic structural pattern fixed to the tension tester, 3 indicates a recording means, for instance, a camera arranged oppositely to the tensile test piece, 4 is a photographing lens of a camera, 5 is a recording medium, for instance, a sensitive-plate, and the test piece may be provided with a grating in a form of a periodic structural pattern as shown in FIG. 2. In this instance, the grating is deformed similarly as the deformation of the tensile test piece. At the measurement test, the deformation of the test piece is, in the first place, photographed on the sensitive-plate through the photographing lens 4. The sensitive-plate is developed as hard as possible in order to obtain bright diffracted beam in the highest order when diffraction figure is reproduced from the sensitive-plate later.

In the second place, the above-mentioned sensitive-plate is treated by a diffraction reproducing apparatus. FIG. 3 shows an embodiment of the apparatus wherein the reference numeral 7 represents a laser device serving as a light source, 8 designates a beam enlarging optical system of the laser device, 9 is a translucent mirror acting as a beam splitter, 10 and 11 are total reflectors respectively, 12 is a translucent mirror, 5' is a photographed sensitive-plate, 13 is a selective lens for diffraction orders, 14 is a diaphragm for selecting diffraction orders and 15 is a camera for photographing diffraction figure. In some cases, it may be used as an angle transmissive filter substituting for the lens 13.

In the foregoing apparatus, light flux in a form of fine line from the laser device 7 is deformed to a collimated light flux of an appropriate bigness through the beam enlarging optical system 8 and reaches to the translucent mirror 9 to be separated into two light passages. One of the two light passages, that is, penetrating beam A is reflected on the total reflector 10 and the translucent mirror 12 to be incident upon the sensitiveplate 5' by an incident angle $\theta$, while the other of the passages, that is, reflected beam B is reflected on the total reflector 11, then penetrates through the translucent mirror 12 to be incident upon the sensitive-plate 5' by an incident angle $-\theta$ thereby causing diffraction grating. The incident angle $\theta$ is an angle indicating the direction of diffracted beam of the n order formed by the light which is incident vertically upon the photographed grating, thus the angle $\theta$ is calculated by the following equation: $\theta = \sin^{-1}(n.\lambda/p)$
wherein the wave length of the laser device is represented by the symbol $\lambda$, the order of diffracted beam is designated by n and the pitch of the grating is denoted by $p$.

Two light fluxes A and B are diffracted on the grating of the sensitive-plate 5' respectively and the applied diffracted beam of the +n orders and the —n orders are projected toward the normal direction of the sensitive-plate. In order to select only the diffracted beam of the normal direction, the beam is made to pass through the selective lens 13 to form a point image of the diffracted beam on the focal plane and is interfered by selecting two point images formed on the axis by means of the diaphragm 14. The interference fringe formed in this way increases the deformation amount of the diffraction grating formed on the sensitive-plate by $2n$ times. After being photographed with the camera 15, the interference fringe is analyzed by a conventional process or, for certain purposes, is measured for the deformation amount through observation by direct vision. According to the aforementioned process, photographic sensitivity can be increased all the more as a diffracted beam of higher order is used. Therefore, the grating having very fine pitch is not required. In case when a grating similar to the one used in a conventional Moire process is used for interfering diffracted beam of +5 orders, it is possible to obtain sensitivity higher by 10 times than that in the Moire process.

FIG. 4 shows a modified embodiment of a diffraction reproducing apparatus wherein the light passage is varied after the translucent mirror 9 for a beam splitter, and diffracted beam from the photographed sensitive-plate 5' can be taken out as reflection diffracted beam besides transmission diffracted beam in case of necessity. In the foregoing apparatus, light flux from the laser device 7 is divided into two light passages by the translucent mirror 9 after having passed through the beam enlarging optical system 8, and one of the two light passages is incident upon the sensitive-plate 5' by an angle $\theta$ after having been reflected on the total reflector 11 while the other of the light passages is incident upon the sensitive-plate 5' by an angle $-\theta$ after having been reflected on the total reflectors 10 and 10' in sequence. In case of the diffracted beam transmitting the sensitive-plate is used, it is photographed with the camera 15 after passing through the selective lens 13 for diffraction order and the diaphragm 14 for selecting diffraction order. On the other hand, in case the reflection diffracted beam of the sensitive-plate is used, the reflected beam from the sensitive-plate is reflected on the total reflector 16 and is photographed with the camera 15' after passing through the selective lens 13' for diffraction order and the diaphragm 14' for selecting diffraction order.

More specifically, in the aforementioned embodiment, the sensitive-plate 5' is illuminated with two light fluxes so as to superpose conjugated or nearly conjugated wave front one upon the other, and the interference fringes formed by the foregoing superposition are observed. However according to the present invention, the sensitive-plate 5' may be illuminated with one light flux and two wave fronts among projected wave fronts are superposed one upon the other.

In case the test object 2 is a large-sized one, the magnification of the photographing lens 4 may be varied to effect a contraction recording for the measurement, or the reverse process is available.

Moreover, in the above-mentioned embodiment, the deformation only in one direction is measured, but it is possible to measure the deformation in two directions by turning the recording medium 12.

Next, the process for forming a periodic structural pattern on the test object when the test object is not provided with periodic structural pattern will now be explained. Particularly this instance process is very advantageous because the diffraction wave in the diffraction reproducing apparatus can be increased to higher orders when the contrast of the periodic structural pattern is high.

There are four kinds of processes for forming a periodic structural pattern of high contrast which will be explained hereinafter by turns.

1. The test object is subjected to flat workings such as surface grinding and the worked surface is treated with black plating or coated with black paint. Then aluminum evaporation-deposition layer or other layer having high reflection factor is formed over the treated black surface. Further, photo resistant substance is coated over the treated surface for photographic printing of the master provided with the periodic structural pattern.

After the foregoing treatment, an etching treatment is effected to expose the black treated substrate by corrosion on the layer of high reflection factor corresponding to the pattern so as to obtain a test object having the pattern of large contrast between the treated black surface and the layer of high reflection factor such as aluminum.

2. Photo-resistant substance is coated over a thin material in a form of a sheet such as aluminum plate having high reflection factor for photographic printing of the master having a periodic structural pattern. This treated material is dipped into dystuff and is washed to remove excessive dystuff after having been taken out therefrom. In this way a periodic structural pattern of high contrast is obtainable through coloration of the pattern. The sheet having the pattern formed by the above-mentioned manner is used after having been attached to the test object by bonding agent.

3. A periodic structural pattern is formed on one surface of transparent material in a form of a thin film such as one made of resin by means of photographic printing treatment. On the reverse surface, a surface of high reflection factor is formed with such as aluminum or the like, thereby the pattern having large contrast can be obtained. Thus obtained pattern is used after having been attached to the test object.

4. A periodic structural pattern having an angular, circular or other periodical uneven sectional shapes is formed on the film-like material of relatively low elastic modulus. Thus formed film-shape pattern is used after being adhered to the test object.

When the test object is illuminated from an appropriate direction at the photographing, a periodic structural pattern of high contrast between the brightly reflected portion and the shadowy portion can be photographed.

when the periodic structural pattern 6 of the test object 2 is photographed, the pattern surface 6 should be disposed perpendicular to the optical axis of the camera 3. Otherwise the pitch of the pattern 6 is photographed in deformation by appearance whereby measurement error is caused, and partial clouding of photographed image caused.

Mechanism for checking and correcting the precision of the right angle formed by the surface of the test object 2 and the camera 3 in order to eliminate the aforementioned drawbacks will now be explained hereinafter with reference to the following drawings in a form of an embodiment.

Figure 6:
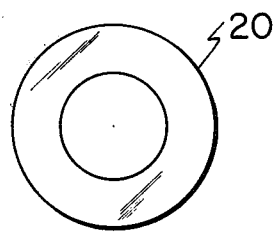
FIG. 6 is a schematic plane view of a ground glass plate disposed within the device shown in FIG. 5.

In FIG. 5, a ground glass plate 20 marked with coodinate indices is illuminated with an illumination lamp 17 through a translucent mirror 19 tilted by 45° against an illumination lens 18 and an optical axis. The ground glass plate 20 is marked with coodinate indices as shown in FIG. 6 and is placed on the focal plane of the photographing lens 1 through a swing-up mirror 21 tilted by 45°. Beam from the coodinate indices is reflected on the swing-up mirror 21 to be directed towards the test object 2 passing through the photographing lens 1. After being reflected on the test object 2, the beam forms an image on the ground glass plate 4 after returning back through the initial light passage. If the optical axis of the camera is not perpendicular to the surface of the test object, an image formed on the coodinate indices is displaced from said coodinate indices. This displaced image is observed by an ocular 22. By tilting the camera or the test object to coincide the coodinate indices with an image formed on said indices, the optical axis can be maintained perpendicular to the surface of the test object. The swing-up mirror 21 is revolved up to the position indicated by the broken line shown in the drawing for photographing the test object on the sensitive-plate 5 in case of photographing the test object. A translucent mirror having the thickness in the extent not to be influenced by aberration which results in an error for photographed image may be used in place of the swing-up mirror 21 at the time of photographing.

Figure 7:
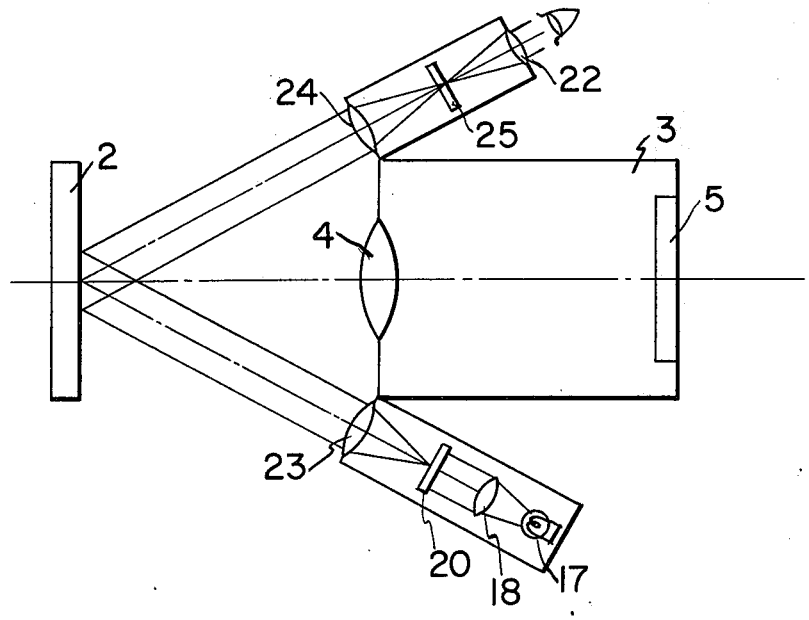
FIG. 7 shows a schematic view of a device applicable to the adjustment process which is a modification of the device shown in FIG. 5.

FIG. 7 shows an apparatus for checking the precision of the right angle formed by the surface of the test object and the optical axis of a camera by observing from the outside of a camera without using a photographing lens of a camera. In FIG. 7, the lens 4 serves as a photographing lens, 5 indicates a sensitive-plate. The ground glass plate 20 provided with coodinate indices (in this instance, it may always not be a ground glass plate) is illuminated with an illumination lamp 17 through an illumination lens 18. The glass plate 20 is mounted on the focal plane of a lens 23. Illumination light is directed toward the test object 2 through the lens 23 to form an image on a ground glass plate 25 having coodinate indices mounted on the focal plane of a lens 24 after the illumination light having been reflected on the test object 2. When an image formed on coodinate indices of the ground glass plate 20 is superposed upon the coodinate indices of the ground glass plate 25, the optical axis of the camera 3 is made perpendicular to the surface of the test object 2, thus, the precision of the right angle formed by the optical axis of the camera and the surface of the test object can be checked through the ocular 22 through the observation for the deflection between the image formed on coodinate indices and the coodinate indices. Moreover, the surface of the test object can be maintained perpendicular to the optical axis of the camera by coinciding an image of coodinate indices with the coodinate indices.

Figure 8:
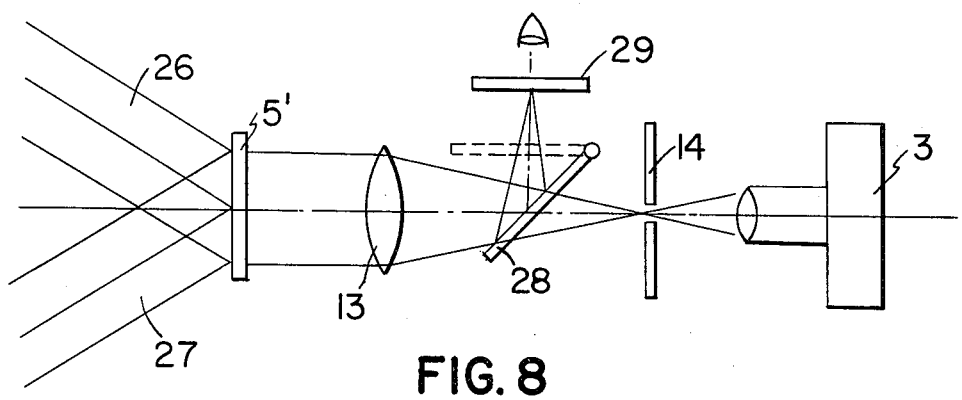
FIG. 8 is a schematic development of a device applicable to the process for obtaining desired diffracted beam.
Figure 9:
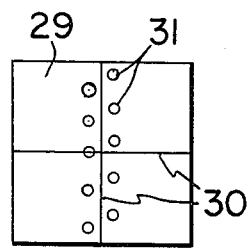

An interference apparatus for wave of desires diffraction order readily taken out from waves of different diffraction orders coming from an object to be photographed will now be explained with reference to FIG. 8. In FIG. 8, the reference numerals 26 and 27 designate incident ray respectively, 5' is a sensitive-plate on which the pattern has already been photographed. Waves of orders diffracted by said sensitive-plate 5' is condensed by the lens 13, then, wave of desired diffraction order only is selected at an order selecting pin-hole 14 provided on the focal plane of the translucent mirror 12 so as to photograph the interference fringe by a camera 3. At this time, a swing-up mirror 28 tilting against the optical axis is interposed between said lens 13 and the pin-hole 14. A ground glass plate 29 is mounted on the focal plane of the lens 13 to be disposed above the swing-up mirror 28. The ground glass plate 29 is marked with a crossed line, for example, as shown in FIG. 9. Diffraction pattern 31 of individual orders is adapted to be observed on the surface of said ground glass plate 29. An intersection point of the crossed line is adjusted in its position corresponding to the center of the pin-hole 14. After the diffraction pattern of wave of desired diffraction order having been superposed upon the intersection point of the crossed line by tilting the incident ray 26 and 27 appropriately, the lens 13 is moved to the position indicated by the broken line shown in the drawing. Thus, only the wave of desired diffraction order can be incident upon the center position of the pin-hole 14. A fixed translucent mirror may be used in place of the swing-up mirror 28.

Figure 10:
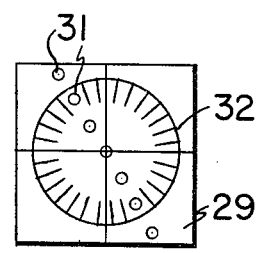

Furthermore, conditions of interference may be varied by turning the sensitive-plate 5' within the plane thereof. For this operation, it is necessary to measure the rotation angle of the sensitive-plate or to figure it out for a certain predetermined angle. When the sensitive-plate 5' is rotated by a certain angle, the diffraction pattern 31 is turned by an angle equivalent to that of the sensitive-plate 5' as shown in FIG. 10. In this instance, the rotative angle of the sensitive-plate can be measured or can also be figured out for a certain predetermined angle by graduating the angular scale 32 as shown in the drawing.

Figure 11:
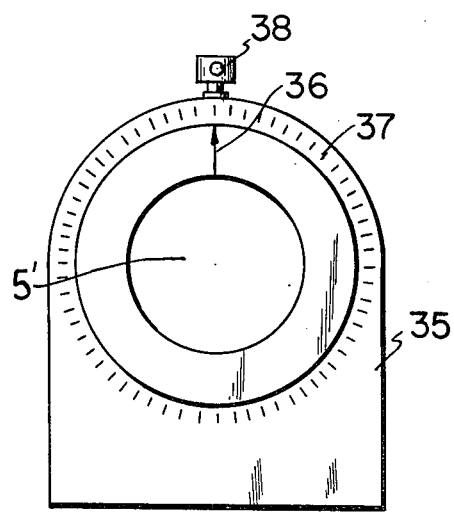
FIG. 11 is a front view and FIG. 12 is a side view thereof.
Figure 12:
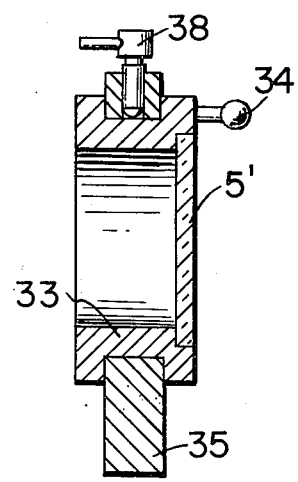

A rotary mechanism for a sensitive-plate will now be explained with reference to FIG. 12 showing the side view and FIG. 11 showing the front view of said mechanism. In FIG. 12, the sensitive-plate 5' is mounted on a rotary plate 33 which is adapted to be rotatable freely within a fixed frame 35 by means of an operative grip 34. In this instance, by marking coodinate indices 36 or graduating angular scale on the rotary plate 33, the rotative angle of the sensitive-plate 5' can be measured and figured out. Moreover, the rotating position of the sensitive-plate 5' may be fixed by an optional angle by using a lock device 38 or a click.

According to the present invention, as is explained hereinbefore, the stage for deforming the test object can be separated from the stage for obtaining interference fringe, and also the condition of less influence from the outer surroundings can be maintained at the time of obtaining interference fringes.

Furthermore, according to the present invention, it is remarkably effective for the foregoing treatment to be carried out on the surface of a test object. In case of unfavourable condition of the surface of a test object, when it is attempted to obtain interference fringe on the surface by illuminating periodic structural pattern formed on the unfavourable surface directly with coherent light, the diffracted wave due to the uneven surface becomes larger than the diffraction due to the periodic structural pattern and the diffracted wave due to the periodic structural pattern is embedded completely within injurious diffracted wave due to roughness. When the periodic structural pattern of a test object being photographed by illuminating the test object with incoherent light under such condition as mentioned above, the information of roughness on the surface of the test object is not recorded because the information is converted into phase distribution, but the periodic structural pattern only is recorded. Therefore, when the photographed object thus obtained is illuminated with coherent light, clear and distinct interference fringe can be obtained.

What is claimed is:

1. A process for measuring fine deformation comprising the steps of:
    deforming a test object having a periodic structure on its surface,
    subjecting the periodic structure of the test object to illumination with incoherent light recording the deformed periodic structure on a recording medium to obtain a recorded object having a deformed periodic structural pattern,
    illuminating said object recorded with incoherent light, with a coherent beam so as to obtain a plurality of diffracted beams,
    directing two diffracted beams from among the plurality of diffracted beams onto an interference surface so as to form an interference fringe pattern, and
    detecting the deformation of the test object on the basis of the interference fringe pattern.

2. The process according to claim 1, wherein said detecting step includes photographing said diffraction fringe.

3. A process for measuring deformation comprising the step of;
    deforming a test object having a periodic structure on its surface,
    subjecting the periodic structure of the test object to illumination with incoherent light recording the deformed periodic structure on a recording medium to obtain a recorded object having a deformed periodic structural pattern,
    illuminating the recorded object by means of two coherent beams so as to obtain one group of diffraction beams from one of said two coherent beams and another group of diffraction beams from the other coherent beam,
    directing one diffracted beam selected from the one group and another diffracted beam selected from the other group to an interference surface so as to obtain an interference fringe pattern on the interference surface, and
    detecting the deformation of the test object from the interference fringe pattern.

4. The process according to claim 3, wherein one of said coherent beams is incident on the diffraction grating at an angle of incidence $\theta$;
    the other of said coherent beams is incident on said diffraction grating at an angle of incidence $-\theta$;
    and wherein said diffraction fringe is formed by the $n^{th}$ and the $-n^{th}$ order diffraction beams formed by said respective coherent beams.

5. A system for measuring deformation comprising a first and a second sub-system, the first sub-system including an image forming optical system to subject a body having a periodic structure to illumination with incoherent light and to form an image of the body on a recording medium so as to form a diffraction grating, the second sub-system comprising:
    means for holding the recorded image obtained by means of the first sub-system,
    coherent means for illuminating the recorded image being held, and
    a detection-observation system for simultaneous observation of two diffracted beams chosen out of a plural number of diffracted beams, obtained from said recorded image, 6. A system for measuring deformation according to claim 5, characterized in that the means for holding the recorded image, of the second sub system includes a rotating means to enable the rotation of the recorded image in a plane.

7. A system for measuring deformation characterized in that said system comprises
    a first and second sub-system, whereby the first sub-system comprises an image forming optical means to subject a body having a periodic structure to illumination with incoherent light and to form an image of the body on a recording medium, while the second sub-system comprises:
    a holding means for holding the recorded image obtained by means of the first sub-system, said image forming a diffraction grating,
    means for producing first and second coherent beams illuminating the recorded object at different angles, and
    a detection - observation system by means of which the $n^{th}$ order diffracted beam produced by the first coherent beam, and the $-n^{th}$ order diffracted beam produced by the second coherent beam are isolated.

8. A system for measuring deformation according to claim 7, characterized in that the means for producing the first and the second coherent beams of the second sub-system includes a single light source.

9. A system for measuring deformation according to claim 7, including means for adjusting the incident angles of the first and the second coherent beams of the second sub-system.

10. A system for measuring deformation according to claim 7, characterized in that the holding means for holding the recorded image of the second sub-system includes means for rotating the recorded image in a plane by means of which the recorded image, after having being illuminated by said two coherent beams in first position can be illuminated by said beams in another position different than said first position.

* * * * *

UNITED STATES PATENT OFFICE
CERTIFICATE OF CORRECTION

Patent No. 3985444            Dated October 12, 1976

Inventor(s) Matsuo Takashima et al

It is certified that error appears in the above-identified patent and that said Letters Patent are hereby corrected as shown below:

In the heading of the Patent [21] should read as follows:

-- [21] Appl. No. 507,286 --.

Signed and Sealed this

Eighteenth Day of January 1977

[SEAL]

Attest:

RUTH C. MASON
*Attesting Officer*

C. MARSHALL DANN
*Commissioner of Patents and Trademarks*